(12) United States Patent
Locatelli et al.

(10) Patent No.: US 11,018,522 B2
(45) Date of Patent: May 25, 2021

(54) COMPUTER-IMPLEMENTED METHOD FOR CONFIGURING ELECTRONIC RELAYS IN AN ELECTRIC POWER DISTRIBUTION GRID

(71) Applicant: ABB S.p.A., Milan (IT)

(72) Inventors: Emilio Battista Locatelli, San Pellegrino Terme (IT); Simone Micheli, Zogno (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 16/348,303

(22) PCT Filed: Oct. 19, 2017

(86) PCT No.: PCT/EP2017/076739
§ 371 (c)(1),
(2) Date: May 8, 2019

(87) PCT Pub. No.: WO2018/086840
PCT Pub. Date: May 17, 2018

(65) Prior Publication Data
US 2019/0280522 A1    Sep. 12, 2019

(30) Foreign Application Priority Data
Nov. 8, 2016  (EP) ..................................... 16197701

(51) Int. Cl.
*H02J 13/00*      (2006.01)
*G05B 19/042*    (2006.01)

(52) U.S. Cl.
CPC ...... *H02J 13/0017* (2013.01); *G05B 19/0426* (2013.01); *H02J 13/00001* (2020.01);
(Continued)

(58) Field of Classification Search
CPC ............ H02J 13/0017; H02J 13/00001; G05B 19/0426; G05B 2219/23261; G05B 2219/25067; Y04S 20/227; Y02B 70/3241
See application file for complete search history.

(56) References Cited

U.S. PATENT DOCUMENTS 7,146,232 B2 * 12/2006 Staron ........................ B63J 2/12
700/83
7,305,272 B2 * 12/2007 Maturana ........... G05B 19/4148
700/83
(Continued)

FOREIGN PATENT DOCUMENTS

EP        1359482 A1    11/2003

OTHER PUBLICATIONS

European Patent Office, International Search Report & Written Opinion issued in corresponding Application No. PCT/EP2017/076739, dated Jan. 24, 2018, 13 pp.
(Continued)

*Primary Examiner* — Charles R Kasenge
(74) *Attorney, Agent, or Firm* — Taft Stettinius & Hollister LLP

(57) ABSTRACT

A method for configuring one or more electronic relays in an electric power distribution grid, said electronic relays being operatively associated to corresponding switching devices of said electric power distribution grid, wherein it includes the following: providing a graphic user interface on a computer display, the graphic user interface including graphic resources activatable by a user; providing first graphic resources on said graphic user interface to select a configuration graphic template, the configuration graphic template representing a corresponding control logic model for configuring the electronic relays, the control logic model including one or more logic elements configurable by means of corresponding sets of configuration values; providing
(Continued)

Figure 1:
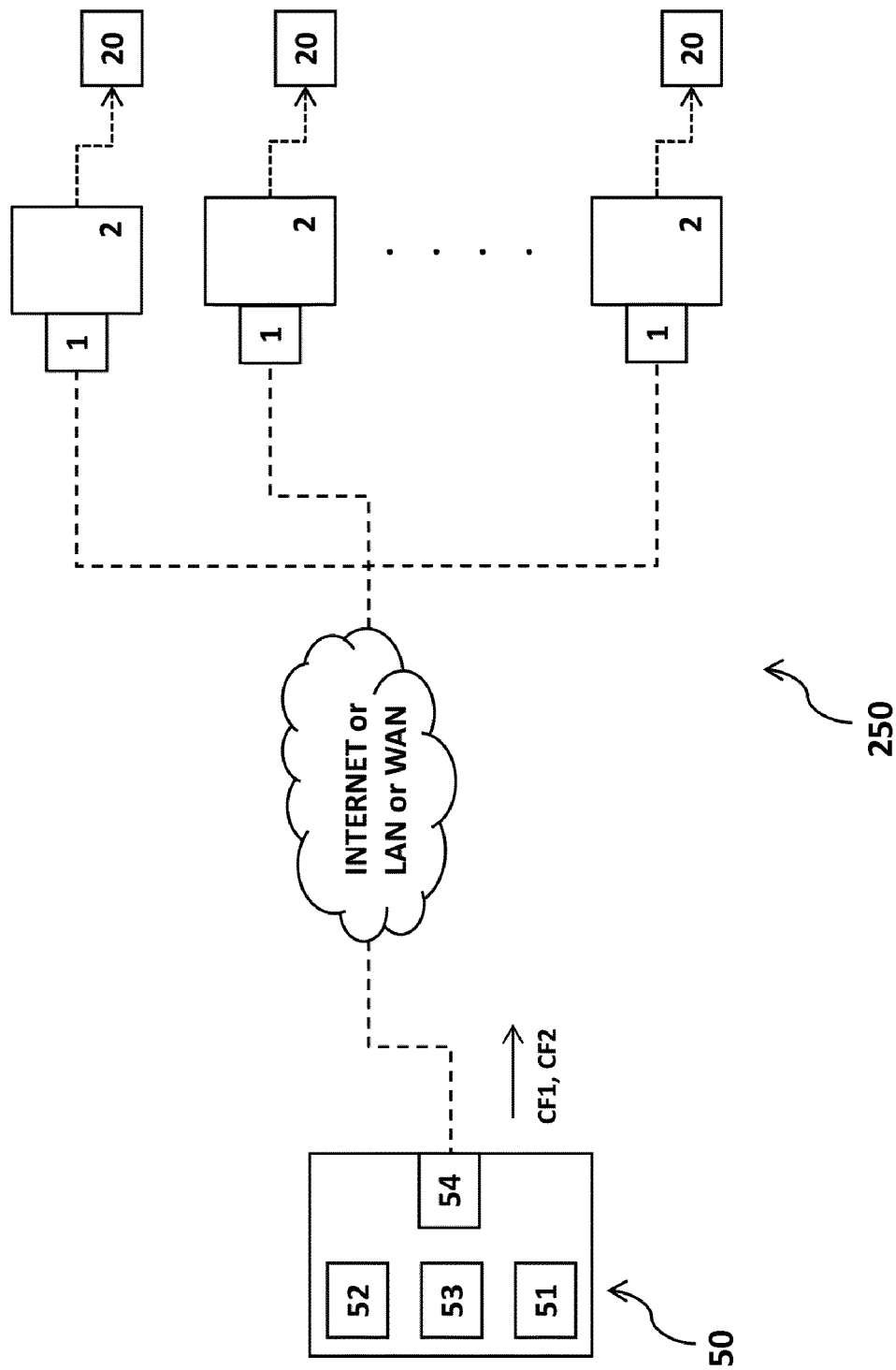

second graphic resources to configure one or more configurable logic elements of a control logic model represented by the selected configuration graphic template; providing third graphic resources on the graphic user interface to associate one or more configured logic elements to a corresponding electronic relay; checking whether the electronic relays meet predefined operating conditions; if the operating conditions are met by the electronic relays, transmitting configuration information including the configuration values to the electronic relays.

16 Claims, 11 Drawing Sheets

(52) U.S. Cl.
CPC ............. *G05B 2219/23261* (2013.01); *G05B 2219/25067* (2013.01); *Y02B 70/30* (2013.01); *Y04S 20/20* (2013.01)

(56) References Cited

U.S. PATENT DOCUMENTS

| | | | | |
|---|---|---|---|---|
| 7,640,291 | B2* | 12/2009 | Maturana | G05B 19/4148 700/83 |
| 2003/0061335 | A1 | 3/2003 | Thomas et al. | |
| 2004/0204772 | A1* | 10/2004 | Maturana | G05B 19/4148 700/2 |
| 2004/0205412 | A1* | 10/2004 | Staron | B63J 2/12 714/38.14 |
| 2004/0268186 | A1* | 12/2004 | Maturana | G05B 19/4148 714/38.14 |
| 2006/0238364 | A1* | 10/2006 | Keefe | G05B 23/02 340/646 |
| 2010/0049472 | A1* | 2/2010 | Keefe | G05B 23/02 702/182 |
| 2012/0072142 | A1* | 3/2012 | Keefe | G05B 23/0267 702/60 |
| 2012/0146587 | A1* | 6/2012 | Srinivasan | H01M 10/44 320/138 |
| 2013/0211610 | A1* | 8/2013 | Jachmann | G05B 19/409 700/286 |
| 2014/0371941 | A1 | 12/2014 | Keller et al. | |

OTHER PUBLICATIONS

European Patent Office, Extended Search Report issued in corresponding Application No. 16197701.2, dated Apr. 20, 2017, 7 pp.

* cited by examiner

COMPUTER-IMPLEMENTED METHOD FOR CONFIGURING ELECTRONIC RELAYS IN AN ELECTRIC POWER DISTRIBUTION GRID

The present invention relates to the field of electric power distribution grids. More particularly, the present invention relates to a computer-implemented method to configure the electronic relays of an electric power distribution grid operating at low or medium voltage levels.

For the purposes of the present application, the term "low voltage" (LV) relates to operating voltages lower than 1 kV AC and 1.5 kV DC whereas the "medium voltage" relates to operating voltages up to some tens of kV, e.g. up to 72 kV AC and 100 kV DC.

Electric power distribution grids comprise switching devices (e.g. circuit breakers, disconnectors, contactors, and the like) designed to enable specific sections of an electric power distribution grid to operate properly.

Typically, the above-described switching devices are operatively associated with electronic protection and control devices (hereinafter referred to as "electronic relays") that are adapted to check the operating conditions of the switchgear by means of suitable sensors and generate suitable commands to prompt the intervention of associated switching devices, when required by the operating conditions of the electric power distribution grids, e.g. in the event of failures or overloads.

As is known, the operation of an electronic relay depends on a set of operating parameters (e.g. protection threshold values, communication parameters, grid parameters, and the like) that are stored and duly processed by the relay to exploit its functionalities.

Such operating parameters need to be properly set-up (or "configured" according to a widely used terminology) during the operating life of the relay, e.g. when this latter is installed on the field or during maintenance interventions.

Traditional solutions for configuring operating parameters of electronic relays in electric power distribution grids normally require a time-consuming cabling activity to acquire the inputs and outputs of the relays and an intensive programming activity to model and set-up the functionalities of the relays.

All these activities normally entail the intervention of specialized personnel with a remarkable increase of the overall costs.

In addition, generally, it is not possible to obtain preventive information on whether the configuration of the relays has been correctly carried out before these latter start operating. The main aim of the present invention is to provide a method for setting-up the operating parameters of the electronic relays of an electric power distribution grid, which allows solving or mitigating the technical problems evidenced above.

Within this aim, an object of the present invention is to provide a method to carry out a quick and efficient configuration of the electronic relays.

A further object of the present invention is to provide a method that can be easily carried out even by non-specialized operators.

A further object of the present invention is to provide a method that can be easily computer-implemented without the adoption of expensive processing resources.

These aim and objects are achieved by a method to set-up operating parameters of electronic relays in an electric power distribution grid, according to the following claim 1 and the related dependent claims.

In a general definition, the method, according to the invention, comprises the following steps:
providing a graphic user interface on a computer display, said graphic user interface including graphic resources activatable by a user;
providing first graphic resources on said graphic user interface to select a configuration graphic template, said configuration graphic template representing a corresponding control logic model for configuring said electronic relays, said control logic model comprising one or more logic elements configurable by means of corresponding sets of configuration values;
providing second graphic resources to configure said one or more configurable logic elements of a control logic model represented by a selected configuration graphic template;
providing third graphic resources on said graphic user interface to associate one or more configured logic elements to corresponding electronic relays;
checking whether said electronic relays meet predefined operating conditions;
if said operating conditions are met by said electronic relays, transmitting configuration information including said configuration values to said electronic relays.

Preferably, said first graphic resources comprise one or more first graphic objects, each first graphic object corresponding to a configuration graphic template selectable for configuring said electronic relays.

Preferably, said second graphic resources comprise one or more second graphic objects to assist a user in providing first configuration values for configuring said configurable logic elements, said first configuration values being related to global operating parameters used by said electronic relays.

Preferably, said second graphic resources comprise one or more third graphic objects to assist a user in providing individual second configuration values for configuring said configurable logic elements, said second configuration values being related to individual operating parameters used by said electronic relays.

Preferably, said third graphic resources comprise one or more fourth graphic objects to assist a user in associating each configured logic element to a corresponding electronic relay.

Preferably, said step of checking whether said electronic relays meet predefined operating conditions comprises the step of providing fourth graphic resources on said graphic user interface to assist a user in acquiring information related to the operating conditions met by said electronic relays.

Preferably, said step of checking whether said electronic relays meet predefined operating conditions comprises the step of providing fifth graphic resources on said graphic user interface to assist a user in providing information related to the operating conditions of said electronic relays.

Preferably, said step of transmitting said configuration information to said electronic relays comprises the step of receiving coded information to enable transmission of said configuration values to said electronic relays, the step of checking said coded information and the step of transmitting said configuration information to said electronic relays, if said coded information is correct.

In a further aspect, the present invention relates to a computer program, according to the following claim 9.

In yet a further aspect, the present invention relates to a computer device, according to the following claim 10.

Preferably, said computer device is configured to communicate with said electronic relays through one or more accessory devices. Each accessory device is included in or operatively coupled with a corresponding electronic relay and is configured to operate as an Internet or LAN or WAN gateway for said corresponding electronic relay.

Figure 2:
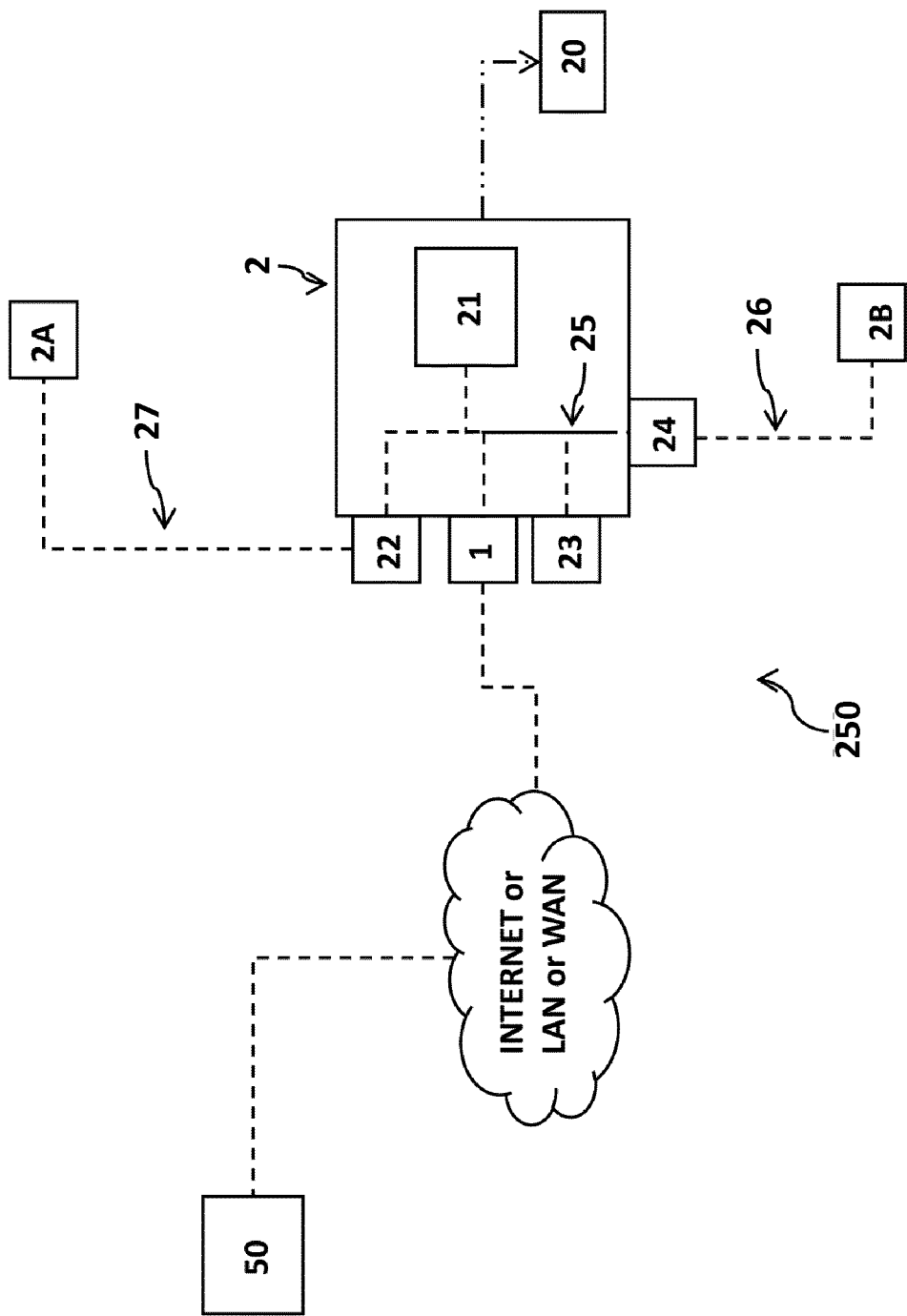
Figure 3:
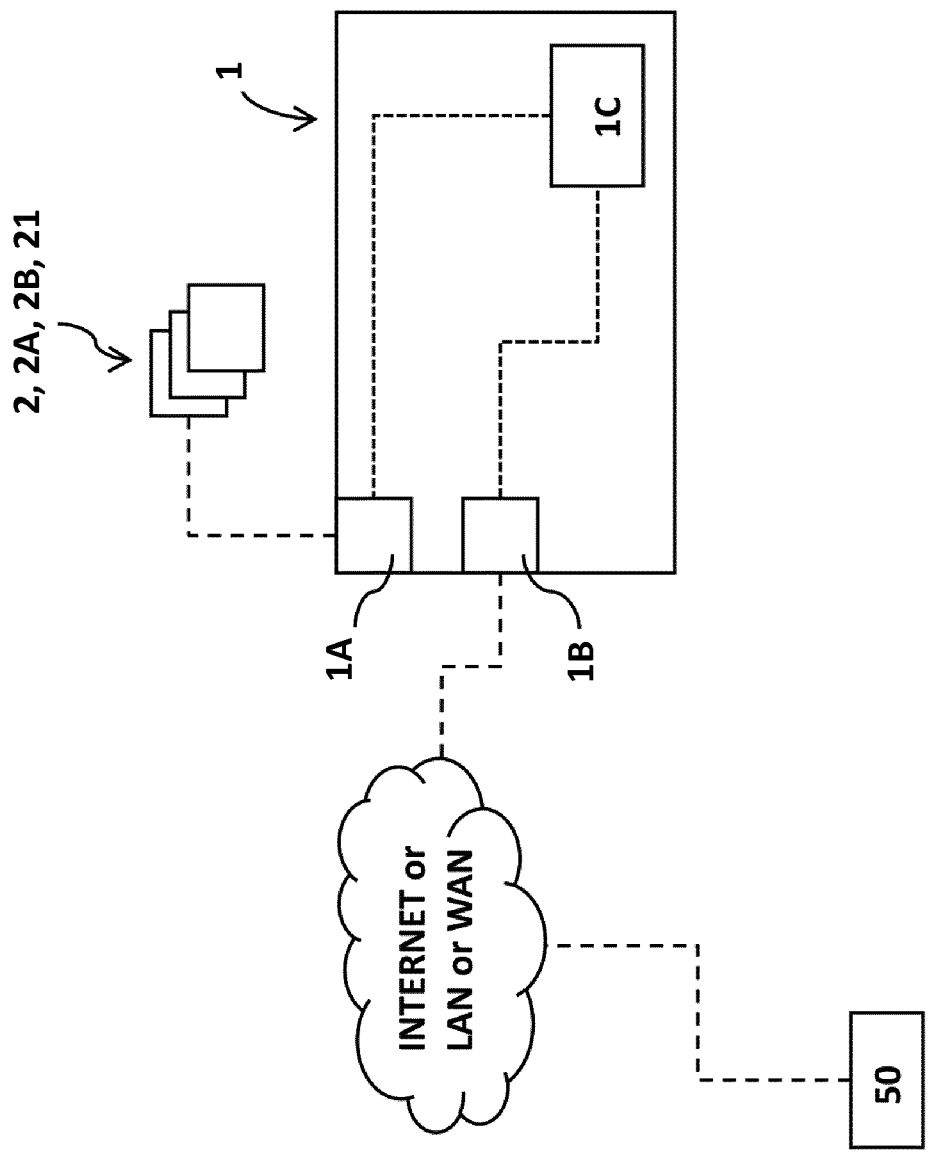
Figure 4:
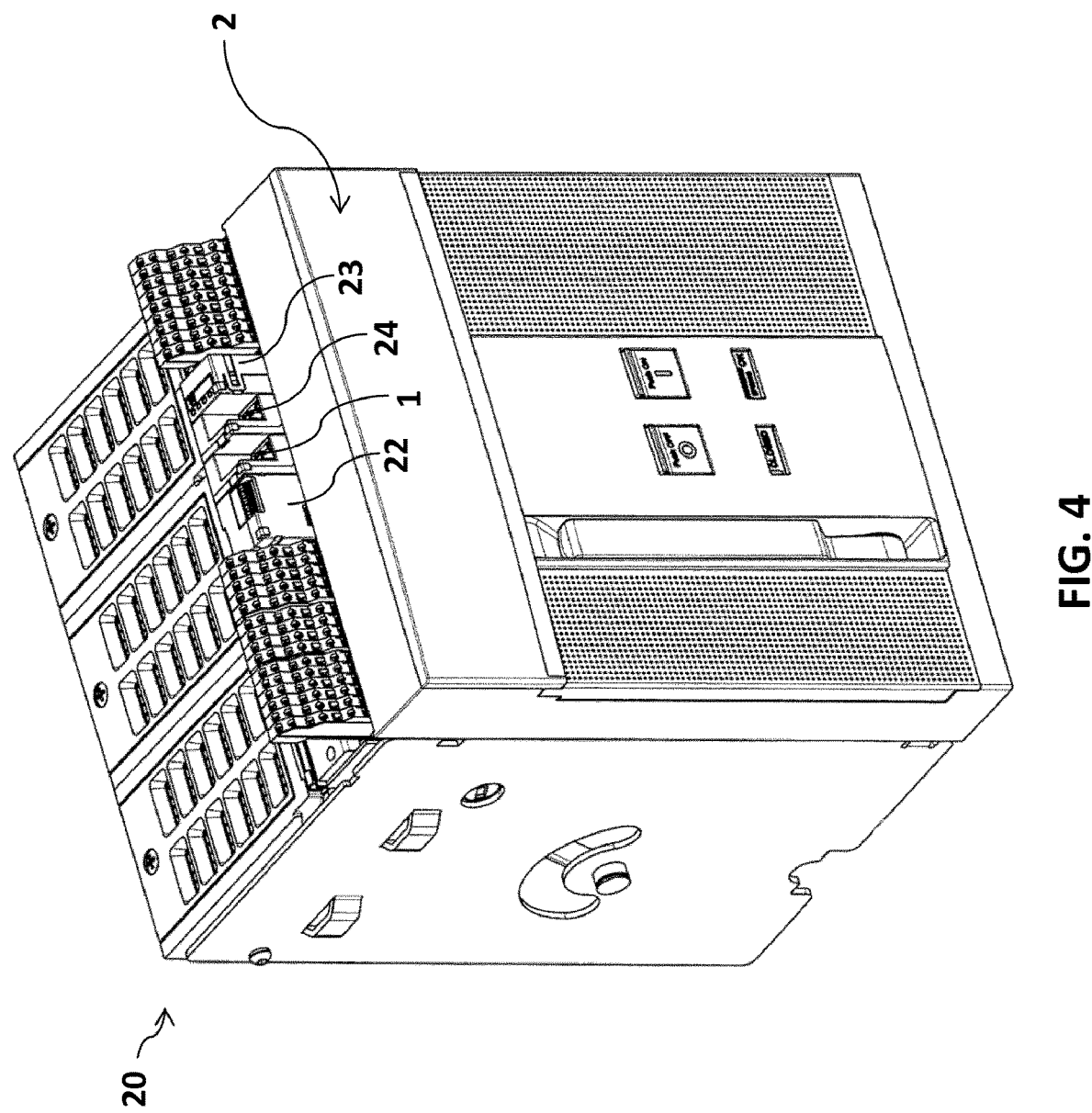

Characteristics and advantages of the present invention will emerge more clearly from the description of preferred, but not exclusive embodiments, of which non-limiting examples are shown in the attached drawings, wherein:

FIGS. 1-3 are a schematic views showing a computer device implementing the configuration method, according to an aspect of the invention;

FIG. 4 schematically shows a switching device operatively associated with an electronic relay provided with an accessory device operating as an Internet or LAN or WAN gateway;

FIGS. 5-11 are schematic views showing the steps of the method, according to the invention.

With reference to the above-mentioned figures, the present invention refers to a method 100 for configuring one or more electronic relays 2 in an electric power distribution grid 250, preferably operating at low voltage levels.

Conveniently, the electronic relays 2 are operatively associated with corresponding switching devices 20 (e.g. a circuit breakers, disconnectors, contactors, or the like) of the electric power distribution grid 250 to control the operation of these latter.

In FIG. 2, an electronic relay 2, according to some embodiments of the invention, is schematically represented.

Preferably, an electronic relay 2 comprises a control unit 21 configured to acquire data related to the operating conditions of the electric power distribution grid 250, check said operating conditions and provide suitable commands to prompt the intervention of the associated switching device 20 in the event of anomalous conditions, e.g. in case of faults or overloads. An electronic relay 2 may comprise or be operatively coupled with various types of communication buses 25, 26, 27.

As an example, an electronic relay 2 may comprise a local bus 25 conveniently designed to provide a communication channel between the control unit 21 and other accessory devices 1, 22, 23, 24 of the electronic protection relay 2. The local bus 25 may implement a communication protocol of the FIELDBUS type, such as ETHERNET, with communication modalities of the "multi-master" type.

As a further example, an electronic relay 2 may communicate with further several electronic protection devices 2A through a system bus 27 of the electric power distribution grid 250. The system bus 27 may be conveniently designed to provide a communication channel between the control unit 21 and further electronic devices 2A (e.g. further electronic relays) that may be also in a remote location with respect to the relay 2. The system bus 27 may implement a communication protocol of the MODBUS, PROFIBUS, PROFINET or MODBUS-TCP type, using communication modalities of the "master-slave" type.

As a further example, an electronic relay 2 can communicate with further electronic devices 2B through a switchboard bus 26 of the switchgear including the relay itself. The switchboard bus 26 is conveniently designed to provide a dedicated communication channel between the protection and control unit 21 and further electronic devices 2B (e.g. further electronic relays) of said switchgear. The switchboard bus 26 may implement a communication protocol of the FIELDBUS type using communication modalities of the "multi-master" type.

An electronic relay 2 may comprise or be operatively coupled with various types of accessory device designed to potentiate/expand (as the accessory device 1) the functions of the control unit 21, to provide an interface towards external communication buses (as the accessory devices 22, 24), to provide an auxiliary interface (as the accessory device 23) for the protection and control unit 21 (such as a display or a LED interface), and the like.

Preferably, each electronic relay 2 is operatively coupled with or comprises an accessory device 1 configured to provide said electronic relay with Internet or LAN or WAN communication capabilities.

Preferably, the accessory device 1 (as the accessory devices 22, 23, 24) is adapted to be removably mounted together with the corresponding electronic protection relay 2 on the switching device 20, as shown in FIG. 4.

However, according to other solutions, the accessory device 1 may be removably mounted on the external case of the corresponding electronic protection relay 2, when this latter is a self-standing unit, or may be an internal electronic module integrated within the corresponding electronic relay 2.

In FIG. 3, an accessory device 1, according to some embodiments of the invention, is schematically represented.

Preferably, an accessory device 1 comprises at least a first communication port 1A suitable for communication with electronic devices (e.g. the control unit 21) included in or operatively connected with the corresponding electronic relay 2.

As an example, the communication port 1A may be an ETHERNET port suitable to be operatively coupled with the local bus 25 of the corresponding electronic relay 2. Preferably, the accessory device 1 comprises at least a second communication port 1B suitable for communication with one or more remote computerized devices 50 through the Internet or a LAN or a WAN.

As an example, the communication port 1B may be a TCP or UDP port suitable for an Internet protocol suite.

Information may be transmitted through an Internet or LAN or WAN line by means of a suitable communication cable (e.g. of the ETHERNET type) or a suitable antenna arrangement (e.g. of the Wi-Fi or Bluetooth type).

Preferably, the accessory device 1 comprises a corresponding processing unit 1C configured to manage its operation.

It is important to notice that the accessory device 1 is capable of providing the corresponding electronic relay 2 with a direct connection to the Internet or a LAN or A WAN without the need of using or arranging dedicated communication buses (such as e.g. the system bus 27). In other words, the accessory device 1 is adapted to operate as an Internet or LAN or WAN gateway through which the relay 2 (in particular the protection and control unit 21 thereof) can directly communicate with a remote computer device 50.

As mentioned above, the method 100, according to the invention, is a method for configuring the electronic relays 2 of an electric power distribution grid 250.

As known to those skilled in the art, "configuring" an electronic relay consists in setting-up a set of operating parameters (e.g. protection threshold values, communication parameters, grid parameters, and the like) used by said electronic relay to exploit its functionalities.

Said operating parameters may relate to the general operation of the electric power distribution grid (global operating parameters) or to the specific operation of the electronic relay (individual operating parameters).

In general, the operating parameters of an electronic relay may be set-up by providing the electronic relay with suitable numeric or logic values (configuration values), which can be stored and processed by the electronic relay itself.

As it will apparently emerge from the following, the method 100, according to the invention, is particularly suitable for being implemented by a computer device 50 and, for the sake of clarity, it will be described in the following with specific reference to this kind of implementation.

In general, the computer device 50 may be of any known type, such a desktop computer, a laptop computer, a tablet, a smartphone or the like.

The computer device 50 is provided with a processing unit 51 (e.g. including one or more microprocessors) that is capable of executing software instructions 510 to implement the method 100, according to the invention.

The computer device 50 comprises a storage memory in which the software instructions 510 are permanently saved.

As an alternative, the computer device 50 may be operatively associated with another memory support from which software instructions 510 may uploaded for execution by the processing unit 51.

The computer device 50 comprises or it is operatively associated to a display 52 that is driven by the processing unit 51.

Conveniently, the computer device 50 has Internet or LAN or WAN communication capabilities. To this aim, it is equipped with one or more communication ports 54 (e.g. an ETHERNET port or a Bluetooth port or a Wi-Fi port) that are driven by the processing unit 51 for communicating with remote electronic devices through the Internet or a LAN or a WAN.

Preferably, the computer device 50 is capable of communicating via the Internet or a LAN or a WAN with the electronic relays 2 by means of the accessory devices 1 of these latter, each accessory device being configured to operate as an Internet or a LAN or a WAN gateway for a corresponding electronic relay, as mentioned above.

Figure 5:
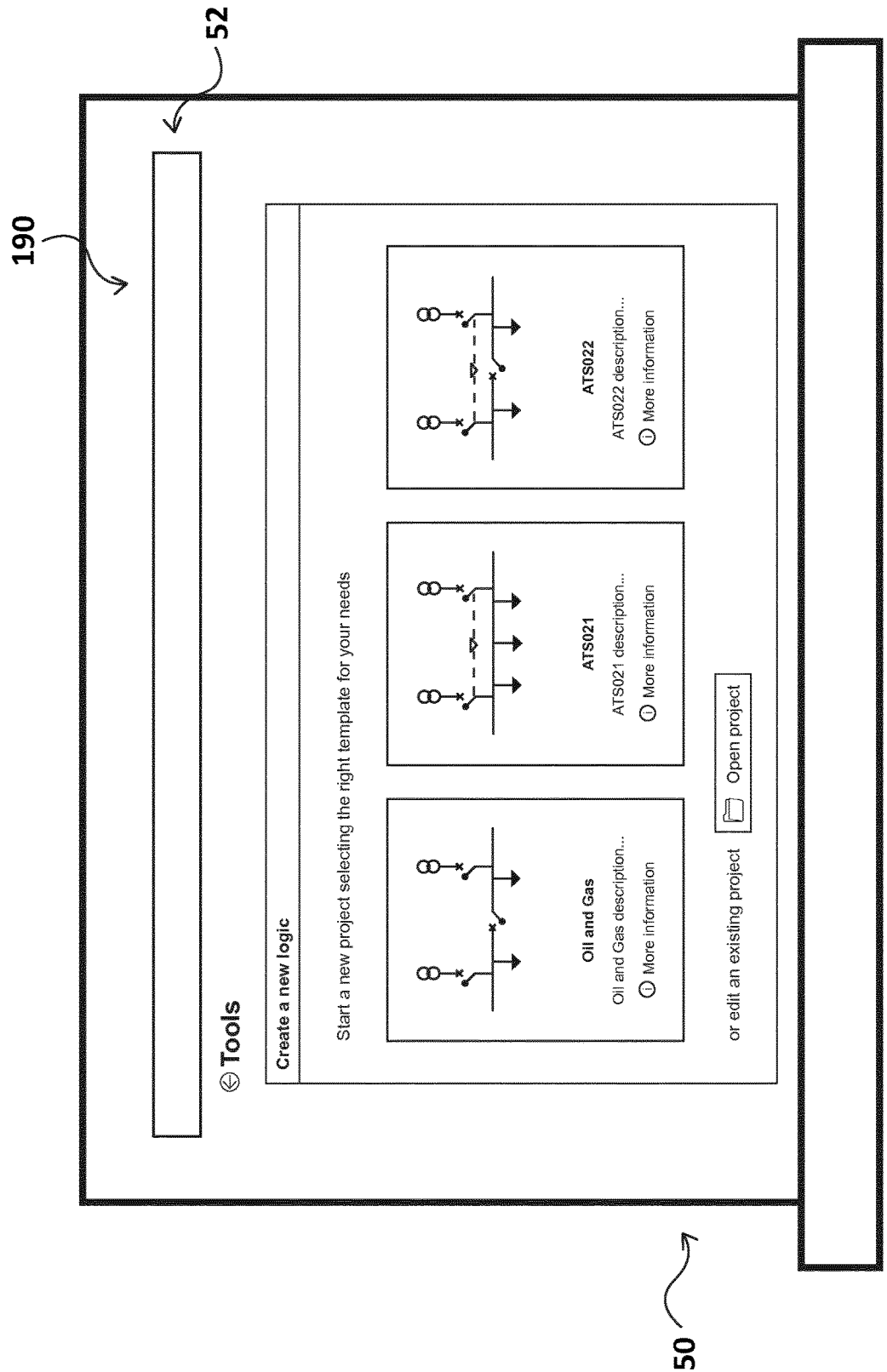

According to the invention, the method 100 comprises a step in which the computer device 50 provides a graphic user interface 190 on the computer display 52 (FIG. 5).

The graphic user interface 190 is a visual graphic environment comprising visual graphic resources 11, 12, 13, 14, 15 (e.g. graphic icons, graphic windows, graphic cursors, visual indicators, visual menus, and the like) to assist a user in configuring the electronic relays 2 by means of the computer device 50.

In general, the graphic resources 11, 12, 13, 14, 15 are made available to assist a user providing in input to the computer device 50 specific commands to execute corresponding actions or information to configure the relays (e.g. the configuration values CF1, CF2).

Conveniently, the graphic resources 11, 12, 13, 14, 15 are activatable in accordance to known activation modes normally adopted in computer devices, e.g. by clicking on said graphic resources through a mouse pointer (e.g. when the display 52 is a computer monitor or a laptop display) or by touching corresponding interactive regions of the display 52 (e.g. when the display 52 is a touch-screen display).

Information can be input by a user in accordance to known input modes normally adopted in computer devices, e.g. by typing or activating dedicated graphic objects (graphic cursors, graphic icons, and the like).

Preferably, the graphic user interface 190 comprises one or more configuration pages, at which the graphic resources 11, 12, 13, 14, 15 are made available.

Preferably, the graphic user interface 190 comprises auxiliary graphic resources 17 (e.g. graphic buttons) on each configuration page to allow a user to navigate through different configuration pages or to save or to upload said configuration pages on/from the storage memory 53.

Figure 6:
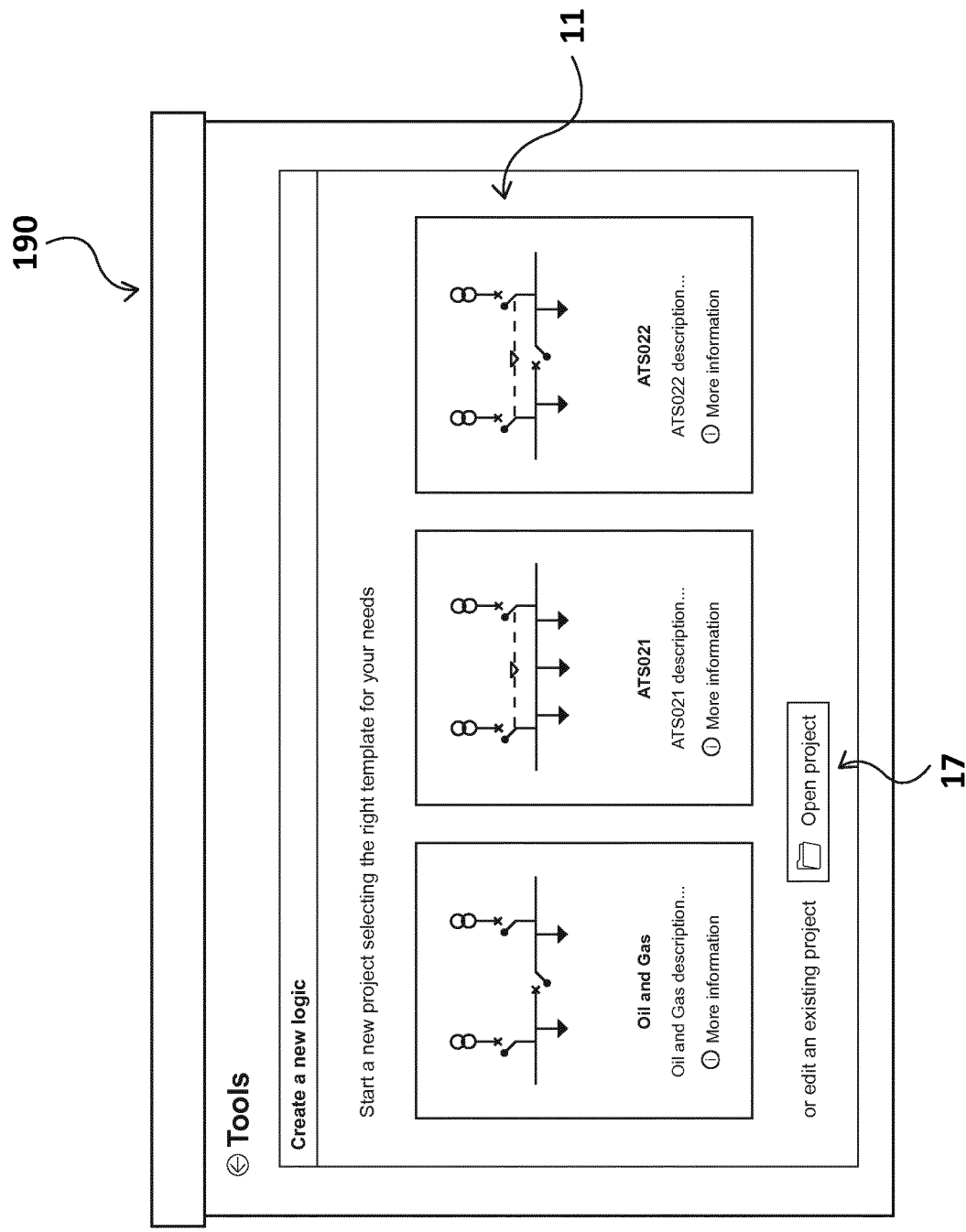
Figure 7:
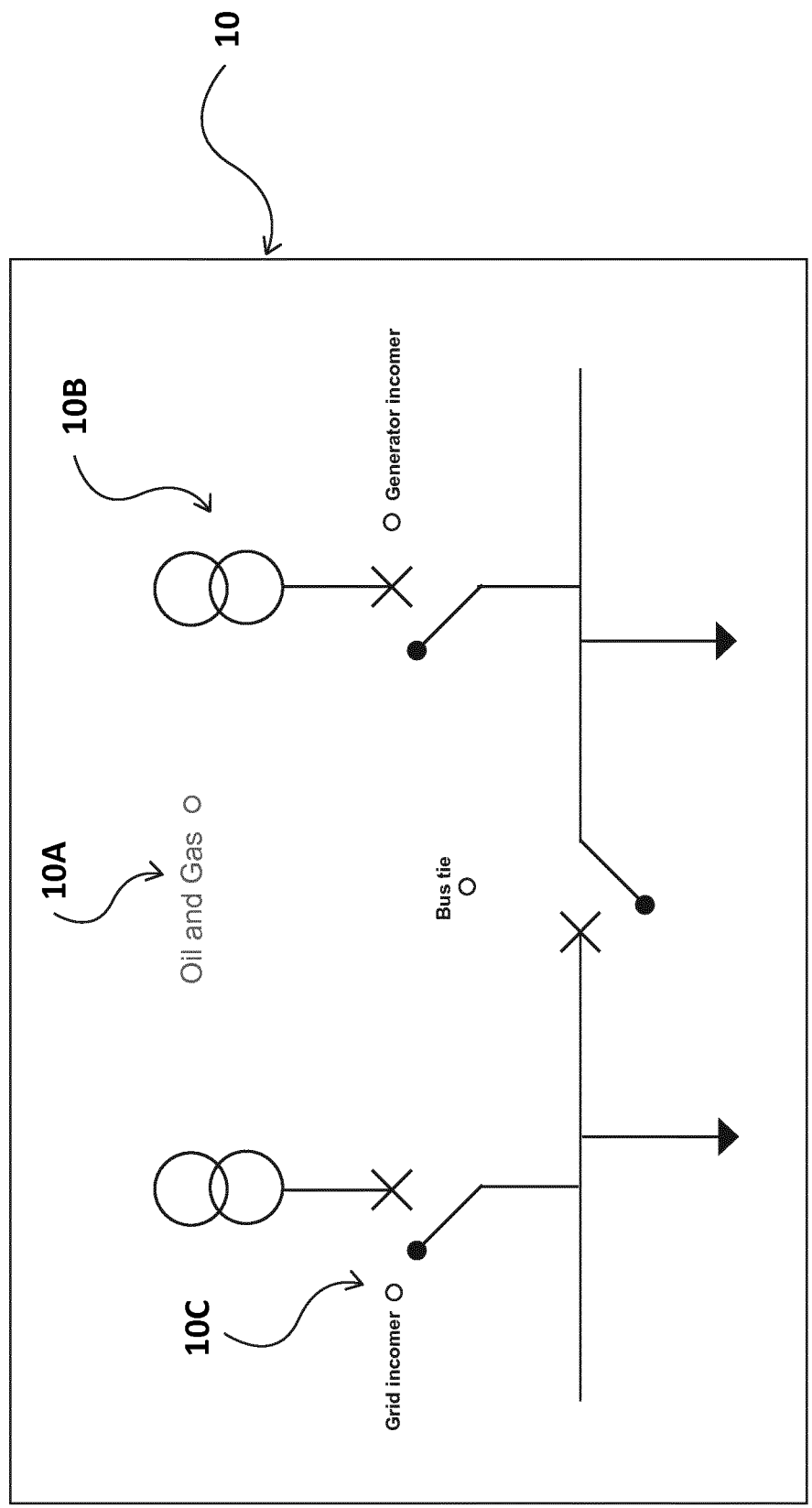

According to the invention, the method 100 comprises a step in which the computer device 50 provides, on the graphic user interface 190 (preferably on a dedicated configuration page), first graphic resources 11 to select a configuration graphic template 10 for configuring the electronic relays 2 (FIGS. 6, 7).

A configuration graphic template 10 graphically represents a corresponding control logic model 10A for configuring the electronic relays 2.

A control logic model 10A describes a possible layout and operation mode implemented by the electric power distribution grid 250 and, more particularly, by the relays 2.

A control logic mode 10A comprises one or more logic elements 10B, each referring to a corresponding set of operating parameters that are configurable by means of suitable configuration values.

A configurable logic element 10B is conveniently indicative of an electronic relay having a same set of operating parameters, which has to be set-up by means of said configuration values.

Of course, the configuration values of a logic element 10B may relate to the above-mentioned global operating parameters and individual operating parameters used by said relay to exploit its functionalities A user can select a given configuration graphic template 10 among one or more predefined configuration graphic templates 10.

By activating the graphic resources 11, selection commands are sent to the computer device 50 to retrieve a desired configuration graphic template 10 among a number of available ones. Conveniently, the configuration graphic templates 10 are designed and validated (e.g. by the provider of the electronic relays 2) before carrying out the configuration process of the electronic relays 2.

In this way, a number of validated control logic models 10A can be made available to a user and a user can select the most appropriate one to configure the electronic relays 2 without the need of modelling ex-novo the operation the electric power distribution grid 250, e.g. using a complicated programming language (e.g. a programming language of a PLC).

In this way, errors in modelling the operation of the electric power distribution grid 250 and, more particularly, of the electronic relays 2 are avoided and the configuration process of the relays 2 can be carried out also by users having a limited expertize in this respect.

The validated configuration graphic templates 10 can advantageously be collected in a library that can be stored permanently in the storage memory 53 or in an equivalent memory support or downloaded from a further computer resource (not shown) in communication (e.g. through the Internet or a LAN or a WAN) with the computer 50.

Preferably, the first graphic resources 11 comprises one or more graphic objects (e.g. graphic icons), each corresponding to a predefined configuration graphic template 10 selectable for configuring the electronic relays 2.

Each graphic object 11 can be activated by a user to retrieve a corresponding configuration graphic template 10. In this way, a user can select the desired configuration graphic template 10 in an assisted manner.

According to the invention, the method 100 comprises a step, in which the computerised device 50 provides a selected configuration graphic template 10 on the graphic use interface 190 (preferably on one or more dedicated configuration pages of this latter) in response to the activation of the graphic resources 11 by a user (FIGS. 8-11).

Figure 8:
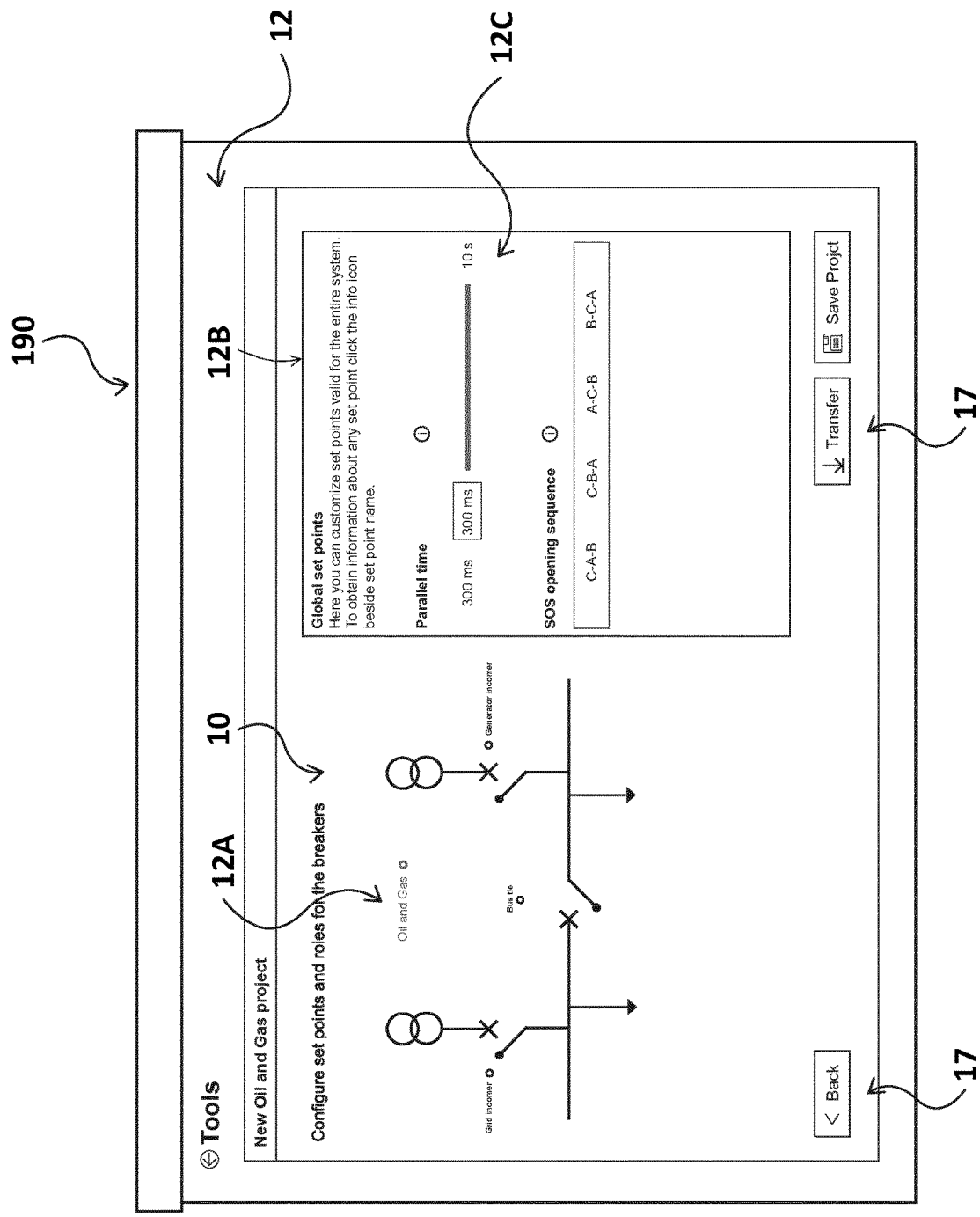
Figure 9:
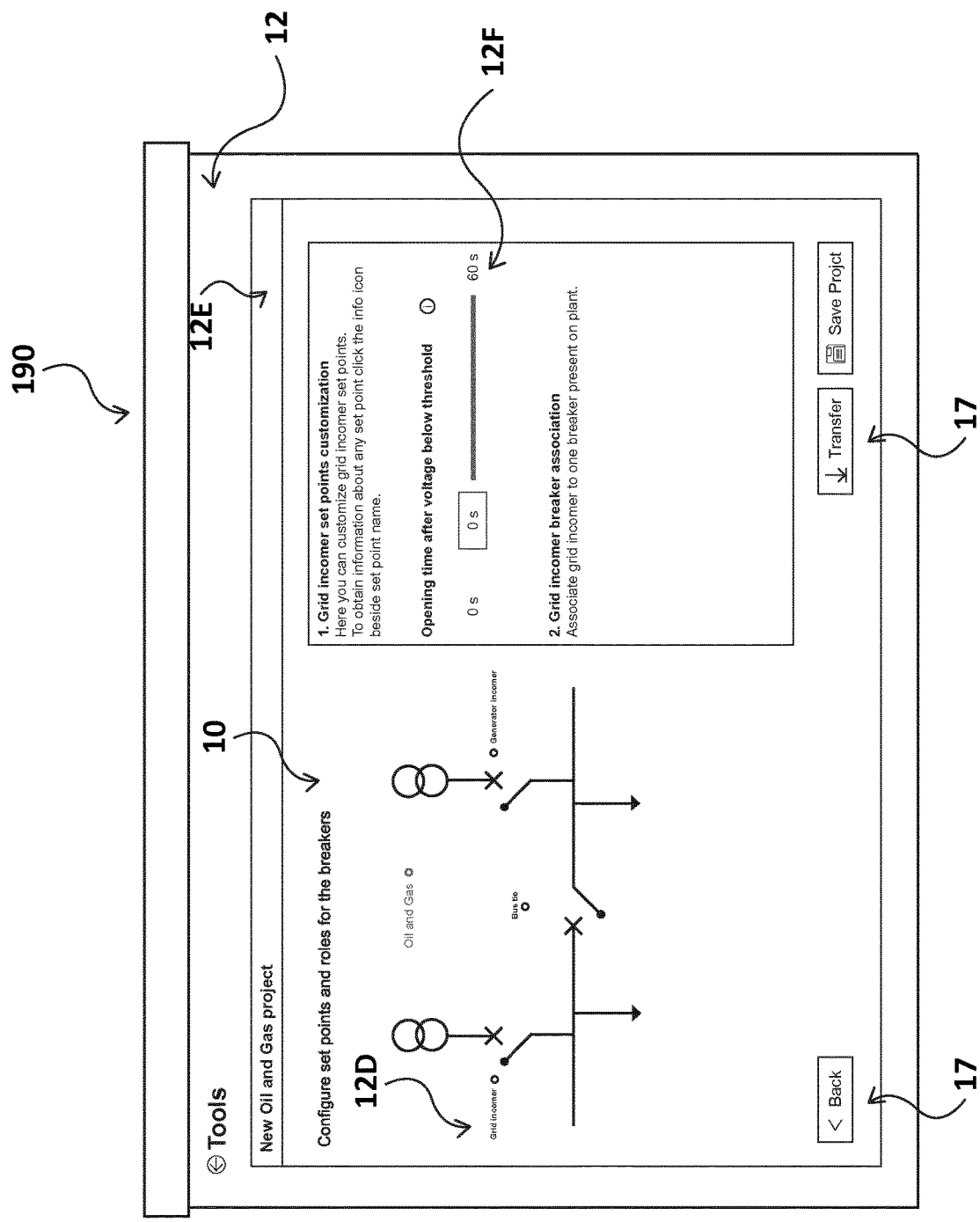

According to the invention, the method 100 comprises a step, in which the computerised device 50 provides second graphic resources 12 that are operatively associated to selected configuration graphic template 10, on the graphic user interface 190 (FIGS. 8-9).

In general, the second graphic resources 12 are directed to assist a user in configuring the configurable logic elements 10B.

In other words, thanks to the second graphic resources 12, a user can provide configuration values to configure the configurable logic elements 10.

Preferably, the second graphic resources 12 are operatively associated to the configurable logic elements 10B of the control logic model 10A represented by the selected configuration graphic template 10.

Preferably, the second graphic resources 12 and the selected configuration graphic template 10, to which they are operatively associated, are made available on dedicated configuration pages of the graphic user interface 190.

Preferably, the second graphic resources 12 comprise one or more second graphic objects 12A, 12B, 12C to assist a user in providing first configuration values CF1 for configuring the configurable logic elements 10B of the control logic model 10A represented by the selected configuration graphic template 10.

Conveniently, the first configuration values CF1 are configuration values related to global operating parameters used by the electronic relays 2. More in details, they are directed to set-up configuration parameters of the logic elements 10B, which correspond to global operating parameters used by the electronic relays 2.

According to an example shown in FIG. 8, said second graphic objects may comprise one or more graphic icons 12A (operatively associated to a corresponding control logic element), which can be activated by a user.

Said second graphic objects may further comprise one or more graphic windows 12B provided by the computerised device 50 in response the activation of the graphic icons 12A. Conveniently, the graphic windows 12B comprise further icons and cursors 12C to allow a user to set-up the first configuration values in an assisted manner.

Preferably, the second graphic objects 12A, 12B, 12C and the selected configuration graphic template 10, to which they are operatively associated, are made available on a dedicated configuration page of the graphic user interface 190.

Once input of the first configuration values is completed, a user can save said configuration page and the related configuration information on the storage memory 53 by activating a suitable auxiliary graphic resource 17 (e.g. a saving button).

Preferably, the second graphic resources 12 comprise one or more third graphic objects 12D, 12E, 12F to assist a user in providing second configuration values CF2 for configuring the configurable logic elements 10B of the control logic model 10A represented by the previously selected configuration graphic template 10 (FIG. 9).

Conveniently, the second configuration values CF2 are configuration values related to individual operating parameters used by the electronic relays 2. More in details, they are directed to set-up configuration parameters of the logic elements 10B, which correspond to individual operating parameters used by the electronic relays 2.

According to an example shown in FIG. 9, the mentioned third graphic objects may advantageously comprise one or more graphic icons 12D (operatively associated to a corresponding control logic element), which can be activated by a user.

Said third graphic objects may further comprise one or more graphic window 12E, which are shown by the computerised device 50 in response the activation of the graphic icons 12D. Conveniently, the windows 12E comprise further activatable icons or cursors 12F to allow a user to set-up the second configuration values in an assisted manner.

Preferably, the third graphic objects 12D, 12E, 12F and the selected configuration graphic template 10, to which they are operatively associated, are made available on dedicated configuration page of the graphic user interface 190.

Once input of the second configuration values is completed, a user can save said configuration page and the related configuration information on the storage memory 53 by activating a suitable auxiliary graphic resource 17 (e.g. a saving button).

At this step of the method 100, one or more sets of configuration values CF1, CF2 are associated to corresponding configurable logic elements 10B of the control logic model 10A represented by the selected configuration graphic template 10.

It is important to notice that each set of configuration values CF1, CF2 is not yet associated to a physical relay 2, as the above described configuration steps have been carried out on the control logic model 10A without intervening on the relays 2.

Figure 10:
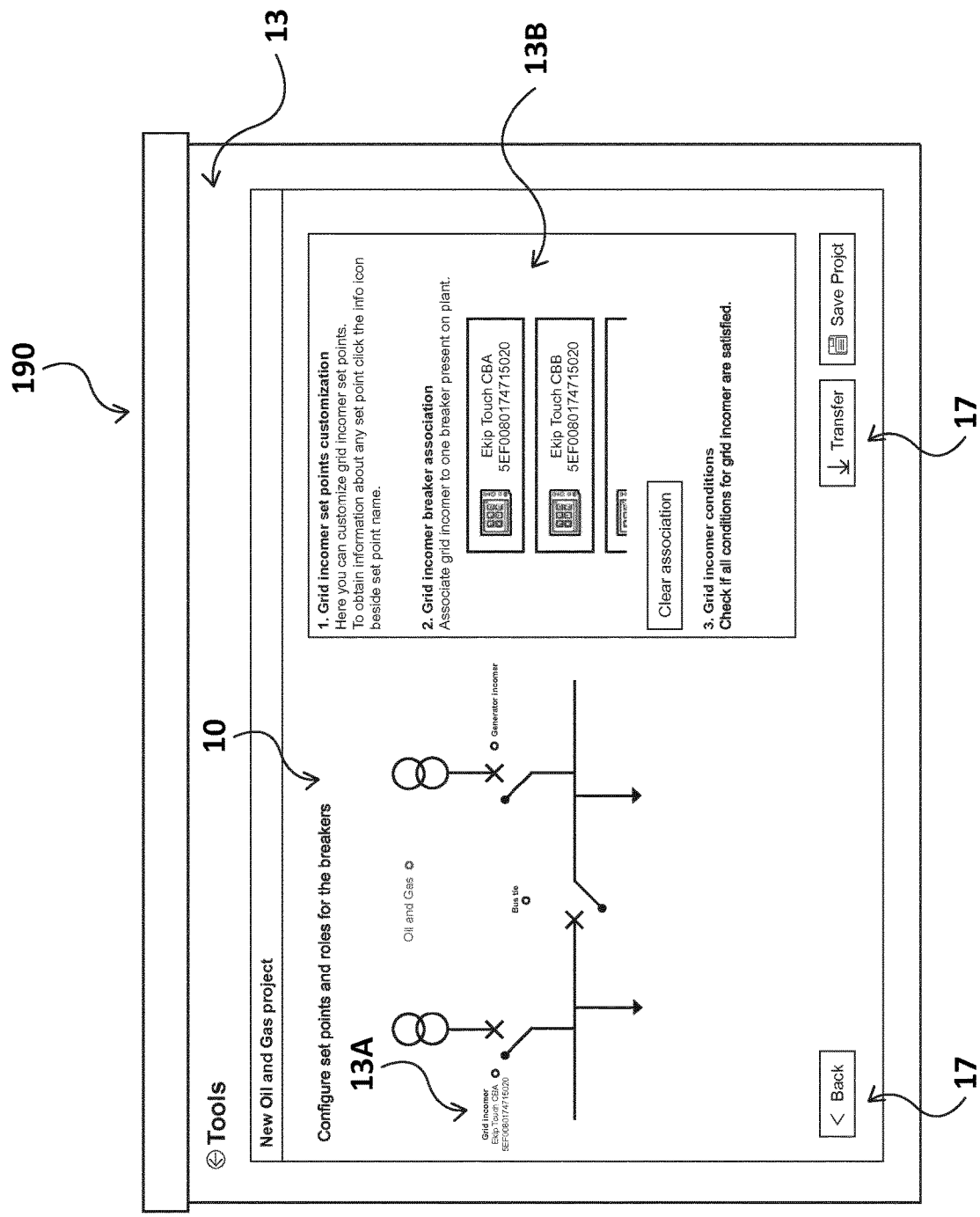

According to the invention, the method 100 comprises a step, in which the computer device 50 provides third graphic resources 13 on the graphic user interface 190, which are operatively associated to the selected configuration graphic template 10 (FIG. 10).

In general, the third graphic resources 13 are directed to assist a user in associating each configured logic element 10B of the control logic model 10A, which is represented by the selected configuration graphic template 10, to a corresponding physical relay 2.

In other words, thanks to the third graphic resources 13, a user can associate each set of configuration values CF1, CF2 (used to configure the configurable logic elements 10B of the control logic model 10A) with a corresponding relay 2.

Preferably, the third graphic resources 13 and the selected configuration graphic template 10, to which they are operatively associated, are made available on a dedicated configuration page of the graphic user interface 190.

Preferably, the graphic resources 13 comprise one or more fourth graphic objects 13A, 13B to assist a user in associating each configurable logic element 10B with a corresponding relay 2. According to an example shown in FIG. 10, said fourth graphic objects may comprise one or more graphic icons 13A (each of which is operatively associated to a corresponding control logic element 10B), which can be activated by a user according to one of the activation modes described above.

Said fourth graphic objects may further comprise one or more graphic windows 13B including corresponding lists of graphic labels 14C, each reporting identification information on a corresponding electronic relay 2.

Preferably, identification information on the electronic relays 2 is stored in the storage memory 53 (or in another equivalent storage support) before carrying out the configuration process described above.

Identification information on the electronic relays 2 may be directly provided by a user 2 (e.g. on a dedicated input page—not shown—of the graphic user interface 190) or can be automatically downloaded by the computerised device 50 from the electronic relays 2 by establishing an Internet or LAN or WAN connection with these latter.

The association between each configured control logic element 10B with a corresponding electronic relay 2 can be carried out by a user in an assisted manner by simply activating, in a selective manner, a corresponding graphic icon 13A and a corresponding graphic label 13B. It is evident from the above that, thanks to the graphic resources 13A, 13B, a user can provide the computer device 50 with linking information on how to associate each configured control logic element 10B with a corresponding physical electronic relay 2.

Said linking information thus allows associating each set of configuration values CF1, CF2 related to a control logic element 10B to a corresponding electronic relay 2.

Preferably, such linking information is stored in the storage memory 53 (or in another equivalent storage support) and is used by the computerised device 50 to correctly transmit the mentioned configuration values CF1, CF2 to the electronic relays 2.

Figure 11:
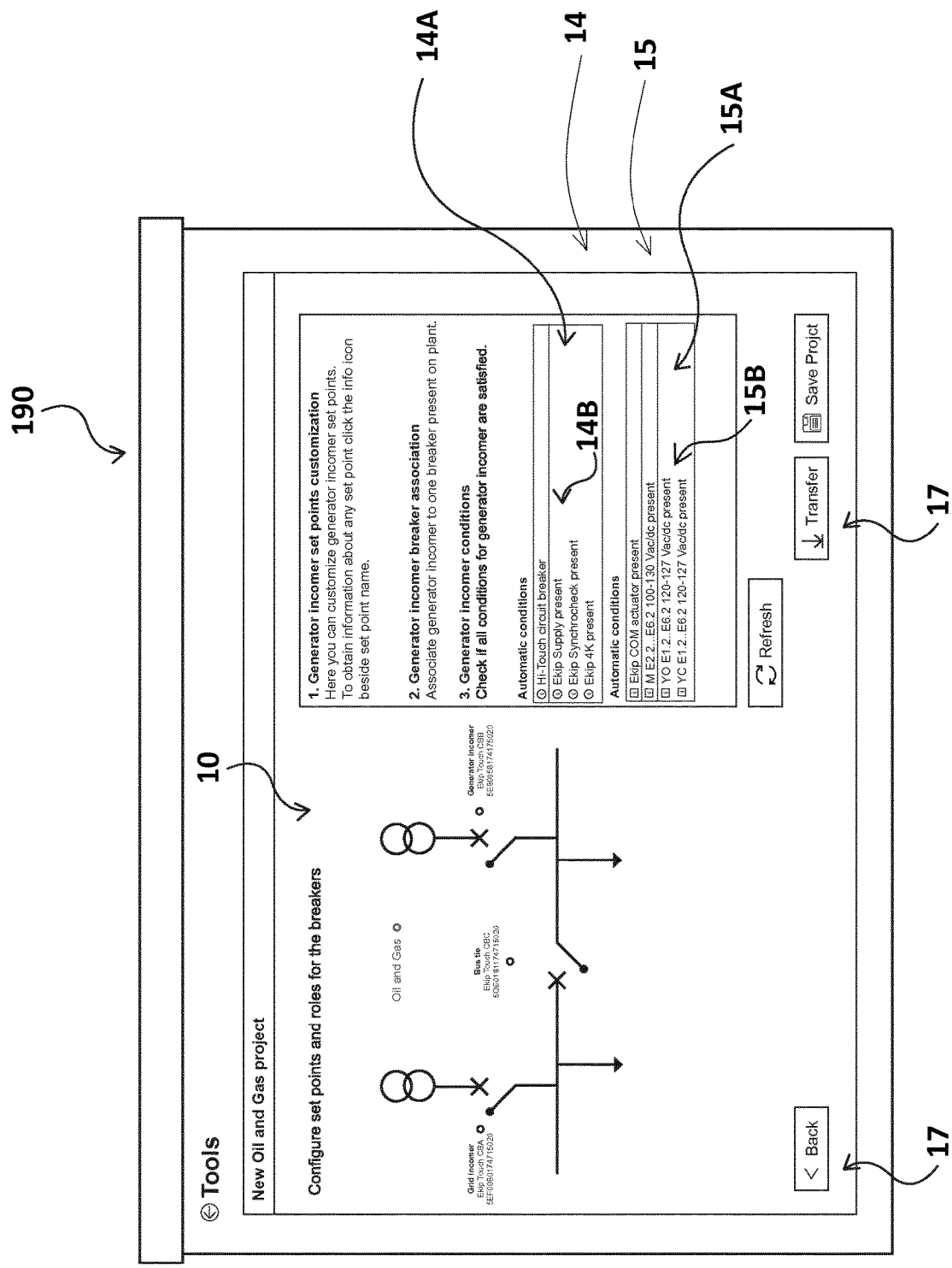

According to the invention, the method 100 comprises a step, in which the computer device 50 checks whether predefined operating conditions are met by the electronic relays 2 (FIG. 11).

This step is quite advantageous as it ensures a subsequent correct transmission of the configuration parameters CF1, CF2 to the electronic relays 2 and, consequently, the prompt operability of the electronic relays once they have been duly configured.

Preferably, said checking step is automatically carried out, at least partially, by the computerised device 50 upon establishing a communication with the electronic relays 2 and the interrogation of each electronic relay 2 by the computerised device 50.

Preferably, the method 100 comprises a step, in which the computer device 50 provides fourth graphic resources 14 on the graphic user interface 190 to assist a user in acquiring information related to the operating conditions met by said electronic relays 2, upon the automatic check performed by the computer device 50.

Preferably, the fourth graphic resources 14 are operatively associated to the selected configuration graphic template 10 on a dedicated configuration page of the graphic user interface 190.

Preferably, the fourth graphic resources 14 comprise one or more fourth graphic objects 14A to display information related to the electronic relays 2.

According to an example shown in FIG. 11, said fourth graphic objects may comprise one or more graphic windows 14A including a list of graphic labels 14B, each reporting information on the operating conditions of the electronic relays 2.

In order to complete the check of the operative conditions of the electronic relays 2, checking information provided by a user may be however be needed.

Preferably, the method 100 comprises a step, in which the computer device 50 provides fifth graphic resources 15 on the graphic user interface 190 to assist a user in providing checking information related to the operating conditions of the electronic relays 2.

Preferably, the fifth graphic resources 15 are operatively associated to the selected configuration graphic template 10.

Preferably, the fifth graphic resources 15 and the selected configuration graphic template 10, to which they are operatively associated, are made available on a dedicated configuration page of the graphic user interface 190.

Preferably, the fifth graphic resources 15 comprise one or more fifth graphic objects 15A, 15B to assist a user in providing said checking information.

According to an example shown in FIG. 11, said fifth graphic objects may comprise one or more graphic windows 15A including corresponding lists of graphic labels 15B, each reporting a predefined piece checking information on the electronic relays 2.

Each piece of checking information conveniently describes an operating condition that must be met by the electronic relays 2.

By selectively activating the graphic labels 15B, a user can send commands to the computerised device 50, which confirm that the corresponding piece of checking information is correct and, consequently, that the corresponding requested operating condition is met by the electronic relays 2.

Once input of checking information is completed, a user can save the corresponding configuration page and the related configuration information on the storage memory 53 by activating a suitable auxiliary graphic resource 17 (saving button).

At this point, the configuration values CF1, CF2 can be transmitted to the electronic relays 2. Accordingly, the method 100 comprises a step, in which the computer device 50 transmits configuration information, which includes the configuration values CF1, CF2, to the electronic relays 2.

Upon receiving the configuration values CF1, CF2, the electronic relays 2 can properly set their operating parameters and start operation.

Preferably, said configuration information is transmitted by the computer device 50 to the electronic relays 2 via the Internet or a LAN or a WAN.

Preferably, the transmission of said configuration information to the electronic relays 2 occurs upon the execution of an authentication procedure.

Preferably, such authentication procedure comprises a step, in which the computer device 50 receives coded information to enable transmission of the configuration values to the electronic relays 2.

Such coded information may be received from a memory support (e.g. a USB storage device) operatively coupled to an input port (not shown) of the computer device 50.

As an alternative, such coded information may be received from a remote computer source in communication with the computer device 50 via the Internet or a LAN or a WAN.

Other solutions are however possible, according to the needs.

Preferably, such authentication procedure comprises a step, in which the computer device 50 checks said coded information to control whether it is correct.

Preferably, such authentication procedure comprises a step, in which the computer device 50 transmits said configuration information to the electronic relays 2, if said coded information is correct.

The method 100, according to the invention, allows fully satisfying the above-mentioned aim and objects.

The method allows a user to carry out the configuration process of the electronic relays in an assisted manner with simple steps that can be carried out also by personnel having small experience in modelling electric power distribution network.

Electronic relays can thus be configured in a quick and efficient manner with a limited probability of errors, as the configuration of the relays is carried out by taking predefined and validated control logic models as a reference.

The method is particularly suitable for implementation by a computer device capable of communicating with the electronic relays 2 through the Internet or a LAN or a WAN.

This allows avoiding or reducing the need for cabling the electronic relays during the configuration process.

The invention claimed is:

1. A method for configuring one or more electronic relays in an electric power distribution grid, said electronic relays being operatively associated to corresponding switching devices of said electric power distribution grid, the method comprises the following steps:
   providing a graphic user interface on a computer display, said graphic user interface including graphic resources activatable by a user;
   providing first graphic resources on said graphic user interface to select one of a plurality of configuration graphic templates, said plurality of configuration graphic templates each representing a corresponding control logic model for configuring said electronic relays, said control logic model comprising one or more logic elements configurable by means of corresponding sets of configuration values, and wherein the plurality of configuration graphic templates are each designed and validated by a provider of the electronic relay other than the user before providing the graphic user interface to the user;
   providing second graphic resources to configure one or more configurable logic elements of a control logic model represented by a selected configuration graphic template;
   providing third graphic resources on said graphic user interface to associate one or more configured logic elements to corresponding electronic relays;
   checking whether said electronic relays meet predefined operating conditions;
   if said operating conditions are met by said electronic relays, transmitting configuration information including said configuration values to said electronic relays.

2. The method, according to claim 1, wherein said second graphic resources comprise:
   one or more second graphic objects to assist a user in providing first configuration values for configuring said configurable logic elements, said first configuration values being related to global operating parameters used by said electronic relays;
   one or more third graphic objects to assist a user in providing individual second configuration values for configuring said configurable logic elements, said second configuration values being related to individual operating parameters used by said electronic relays.

3. The method, according to claim 2, wherein said third graphic resources comprise one or more fourth graphic objects to assist a user in associating each configured logic element to a corresponding electronic relay.

4. The method, according to claim 2, wherein said step of checking whether said electronic relays meet predefined operating conditions comprises the step of providing fourth graphic resources on said graphic user interface to assist a user in acquiring information related to operating conditions met by said electronic relays.

5. The method, according claim 2, wherein said step of checking whether said electronic relays meet predefined operating conditions comprises the step of providing fifth graphic resources on said graphic user interface to assist a user in providing information related to the operating conditions of said electronic relays.

6. The method, according to claim 1, wherein said third graphic resources comprise one or more fourth graphic objects to assist a user in associating each configured logic element to a corresponding electronic relay.

7. The method, according to claim 6, wherein said step of checking whether said electronic relays meet predefined operating conditions comprises the step of providing fourth graphic resources on said graphic user interface to assist a user in acquiring information related to operating conditions met by said electronic relays.

8. The method, according claim 6, wherein said step of checking whether said electronic relays meet predefined operating conditions comprises the step of providing fifth graphic resources on said graphic user interface to assist a user in providing information related to the operating conditions of said electronic relays.

9. The method, according to claim 1, wherein said step of checking whether said electronic relays meet predefined operating conditions comprises the step of providing fourth graphic resources on said graphic user interface to assist a user in acquiring information related to operating conditions met by said electronic relays.

10. The method, according claim 9, wherein said step of checking whether said electronic relays meet predefined operating conditions comprises the step of providing fifth graphic resources on said graphic user interface to assist a user in providing information related to the operating conditions of said electronic relays.

11. The method, according to claim 1, wherein said step of checking whether said electronic relays meet predefined operating conditions comprises the step of providing fifth graphic resources on said graphic user interface to assist a user in providing information related to the operating conditions of said electronic relays.

12. The method, according to claim 1, wherein said configuration information is transmitted to said electronic relays via one of an Internet or a LAN or a WAN.

13. The method, according to claim 1, wherein said step of transmitting said configuration information to said electronic relays comprises the following steps:
   receiving coded information to enable transmission of said configuration information to said electronic relays;
   checking said coded information;
   transmitting said configuration information to said electronic relays if said coded information is correct.

14. A non-transitory computer readable memory medium configured to store instructions executable by a computer to perform acts for configuring one or more electronic relays in an electric power distribution grid, the electronic relays being operatively associated to corresponding switching devices of the electric power distribution grid, the performed acts, comprising:
   providing a graphic user interface on a computer display, said graphic user interface including graphic resources activatable by a user;
   providing first graphic resources on said graphic user interface to select one of a plurality of configuration graphic templates, said plurality of configuration graphic templates each representing a corresponding control logic model for configuring said electronic relays, said control logic model comprising one or more logic elements configurable by means of corresponding sets of configuration values, and wherein the plurality of configuration graphic templates are each designed and validated by a provider of the electronic relay other than the user before providing the graphic user interface to the user;

providing second graphic resources to configure one or more configurable logic elements of a control logic model represented by a selected configuration graphic template;

providing third graphic resources on said graphic user interface to associate one or more configured logic elements to corresponding electronic relays; and checking whether said electronic relays meet predefined operating conditions;

if said operating conditions are met by said electronic relays, transmitting configuration information including said configuration values to said electronic relays.

15. The computer, according to claim 14, wherein it is configured to communicate with said electronic relays through one or more accessory devices, each accessory device being included in or operatively coupled with a corresponding electronic relay and being configured to operate as an Internet or LAN or WAN gateway for said corresponding electronic relay.

16. A method for configuring one or more electronic relays in an electric power distribution grid, said electronic relays being operatively associated to corresponding switching devices of said electric power distribution grid, the method comprises the following steps:

providing a graphic user interface on a computer display, said graphic user interface including graphic resources activatable by a user;

providing first graphic resources on said graphic user interface to select a configuration graphic template, said configuration graphic template representing a corresponding control logic model for configuring said electronic relays, said control logic model comprising one or more logic elements configurable by means of corresponding sets of configuration values;

providing second graphic resources to configure one or more configurable logic elements of a control logic model represented by a selected configuration graphic template;

providing third graphic resources on said graphic user interface to associate one or more configured logic elements to corresponding electronic relays;

checking whether said electronic relays meet predefined operating conditions;

if said operating conditions are met by said electronic relays, transmitting configuration information including said configuration values to said electronic relays, comprising:

receiving coded information to enable transmission of said configuration information to said electronic relays;

checking said coded information;

transmitting said configuration information to said electronic relays if said coded information is correct.

* * * * *